United States Patent
Yoshida

(10) Patent No.: US 12,547,356 B2
(45) Date of Patent: Feb. 10, 2026

(54) IMAGE PROCESSING APPARATUS, METHOD, AND STORAGE MEDIUM

(71) Applicant: CANON KABUSHIKI KAISHA, Tokyo (JP)

(72) Inventor: Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 18/642,502

(22) Filed: Apr. 22, 2024

(65) Prior Publication Data
US 2024/0272843 A1  Aug. 15, 2024

Related U.S. Application Data

(63) Continuation of application No. 18/174,538, filed on Feb. 24, 2023, now Pat. No. 11,995,361.

(30) Foreign Application Priority Data

Mar. 2, 2022  (JP) .................................. 2022-032000

(51) Int. Cl.
*G06F 3/12* (2006.01)
(52) U.S. Cl.
CPC .......... *G06F 3/1222* (2013.01); *G06F 3/1204* (2013.01); *G06F 3/1238* (2013.01); *G06F 3/1253* (2013.01); *G06F 3/1267* (2013.01)
(58) Field of Classification Search
None
See application file for complete search history.

(56) References Cited

U.S. PATENT DOCUMENTS

| | | | |
|---|---|---|---|
| 11,249,698 B2 * | 2/2022 | Kobayashi | G06F 3/1259 |
| 2011/0211218 A1 * | 9/2011 | Gilmore | G06F 3/1267 |
| | | | 358/1.15 |
| 2013/0063774 A1 * | 3/2013 | Nuggehalli | G06F 3/1207 |
| | | | 358/1.15 |
| 2021/0089245 A1 * | 3/2021 | Chiba | G06F 3/1254 |
| 2021/0092244 A1 * | 3/2021 | Liu | G06F 3/0485 |

FOREIGN PATENT DOCUMENTS

| | | | | |
|---|---|---|---|---|
| JP | 2018151706 A | | 9/2018 | |
| JP | 2023141953 A | * | 10/2023 | G06F 3/1238 |

* cited by examiner

*Primary Examiner* — Ted W Barnes
(74) *Attorney, Agent, or Firm* — Canon U.S.A., Inc. IP Division

(57) ABSTRACT

An image processing apparatus includes one or more processors, and one or more memories having instructions stored thereon, when executed by the one or more processors, cooperating with the one or more processors cause the image processing apparatus to accept a selection of a predetermined button, and perform control to display, in a case where the selection of the predetermined button is accepted and a number of jobs of the image processing apparatus is greater than a predetermined number, a screen relating to the job of the number greater than the predetermined number, and to execute, in a case where the selection of the predetermined button is accepted and the number of jobs of the image processing apparatus is equal to the predetermined number, the predetermined number of jobs.

22 Claims, 12 Drawing Sheets

FIG.7A

| STORAGE DATE/TIME | FILE NAME | COLOR | NUMBER OF SHEETS | STORAGE DESTINATION ADDRESS |
|---|---|---|---|---|

| STORAGE DATE/TIME | FILE NAME | COLOR | NUMBER OF SHEETS | STORAGE DESTINATION ADDRESS |
|---|---|---|---|---|
| 2021/12/9 12:34 | CONTRACT.pdf | BLACK & WHITE | 4 | \\Server\keiyaku\CONTRACT.pdf |

| STORAGE DATE/TIME | FILE NAME | COLOR | NUMBER OF SHEETS | STORAGE DESTINATION ADDRESS |
|---|---|---|---|---|
| 2021/12/9 12:34 | CONTRACT.pdf | BLACK & WHITE | 4 | \\Server\keiyaku\CONTRACT.pdf |
| 2021/12/9 14:05 | DISBURSEMENT REQUEST.pdf | COLOR | 1 | \\Server\keiyaku\DISBURSEMENT REQUEST.pdf |

| STORAGE DATE/TIME | FILE NAME | COLOR | NUMBER OF SHEETS | STORAGE DESTINATION ADDRESS |
|---|---|---|---|---|
| 2021/12/9 12:34 | SPECIFICATIONS.pdf | BLACK & WHITE | 40 | \\Server\keiyaku\SPECIFICATIONS.pdf |

710
713

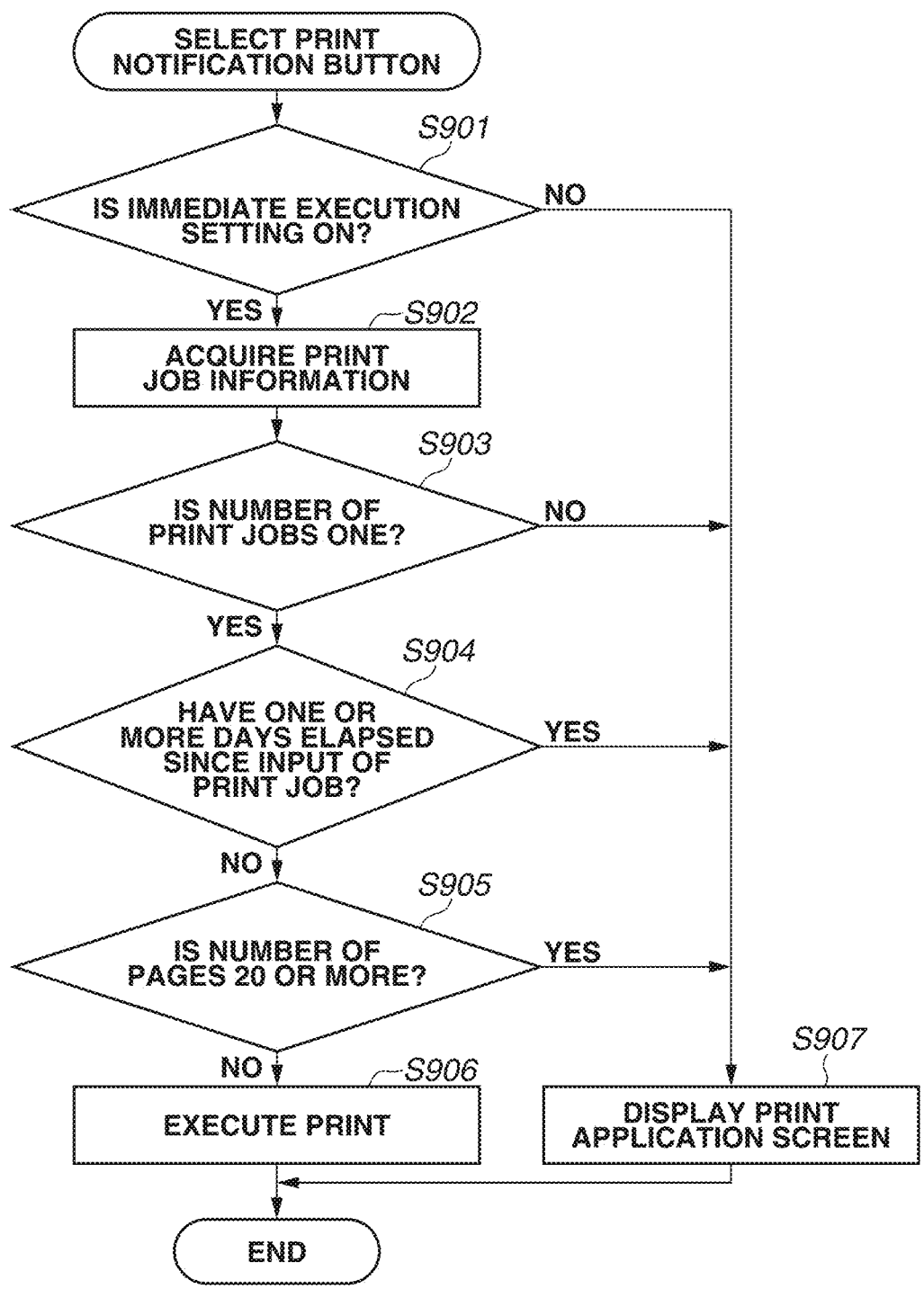

IMAGE PROCESSING APPARATUS, METHOD, AND STORAGE MEDIUM

CROSS REFERENCE OF RELATED APPLICATIONS

This application is a continuation of U.S. patent application Ser. No. 18/174,538, filed Feb. 24, 2023 which claims the benefit of Japanese Patent Application No. 2022-032000, filed Mar. 2, 2022, all of which are hereby incorporated by reference herein in its entirety.

BACKGROUND

Field

The present disclosure relates to execution of a job in an information processing apparatus.

Description of the Related Art

An information processing apparatus that executes a job transmitted from an external apparatus is known. For example, an image forming apparatus (a multifunction peripheral (MFP)) installed in an office can temporarily store a print job transmitted from an external apparatus such as a personal computer (PC) instead of executing the print job when receiving the print job, for purposes such as cost saving by reduction of unnecessary print and prevention of information leakage from a printed sheet. When a user selects a print function on an operation panel of the MFP, the MFP displays a list of stored print jobs. The user can select a print job that the user wants to execute from among the print jobs in the displayed list and can execute the selected print job by providing an execution instruction. This enables achieving the reduction of unnecessary print and the prevention of information leakage, but it is necessary for the user to perform operations such as selection of a function, selection of a job, and giving an execution instruction on the operation panel of the MFP to execute the print job. Japanese Patent Application Laid-Open No. 2015-37314 discusses displaying a button for executing a stored print job with one-touch action on a home screen for selecting a function.

In the case described in Japanese Patent Application Laid-Open No. 2015-37314, when an MFP stores a plurality of print jobs, all of the print jobs are executed at a press of the button, which can result in execution of unintended print jobs.

SUMMARY OF THE INVENTION

Aspects of the present disclosure are directed to a method for enabling execution of a job intended by a user while improving operability for the user.

According to an aspect of the present invention, an image processing apparatus includes one or more processors, and one or more memories having instructions stored thereon, when executed by the one or more processors, cooperating with the one or more processors cause the image processing apparatus to accept a selection of a predetermined button, and perform control to display, in a case where the selection of the predetermined button is accepted and a number of jobs of the image processing apparatus is greater than a predetermined number, a screen relating to the job of the number greater than the predetermined number, and to execute, in a case where the selection of the predetermined button is accepted and the number of jobs of the image processing apparatus is equal to the predetermined number, the predetermined number of jobs.

Further features will become apparent from the following description of exemplary embodiments with reference to the attached drawings.

BRIEF DESCRIPTION OF THE DRAWINGS

FIGS. 7A, 7B, 7C, and 7D each illustrate a print job information table according to the present exemplary embodiment.

FIG. 9 is a flowchart illustrating processing performed at a press of a print button according to the present exemplary embodiment.

DESCRIPTION OF THE EMBODIMENTS

Exemplary embodiments will be described in detail below with reference to the attached drawings. The following exemplary embodiments are not intended to be limiting. Not all of combinations of features described in the exemplary embodiments are necessarily essential for a solution of the present disclosure. In the following exemplary embodiments, an image processing apparatus will be described as an example of an information processing apparatus, but the information processing apparatus is not limited thereto.

Figure 1A:
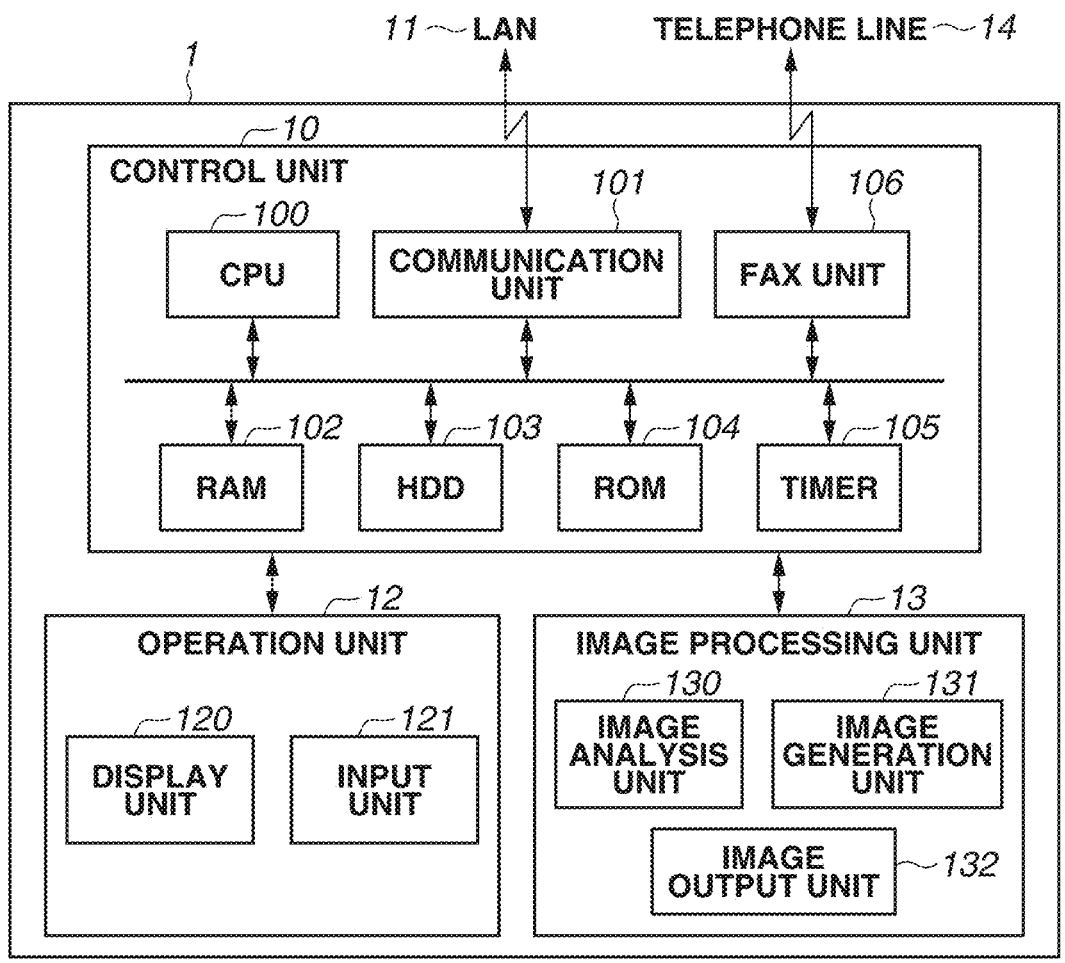
FIGS. 1A and 1B are block diagrams each illustrating a configuration of an image processing apparatus according to an exemplary embodiment.
Figure 1B:
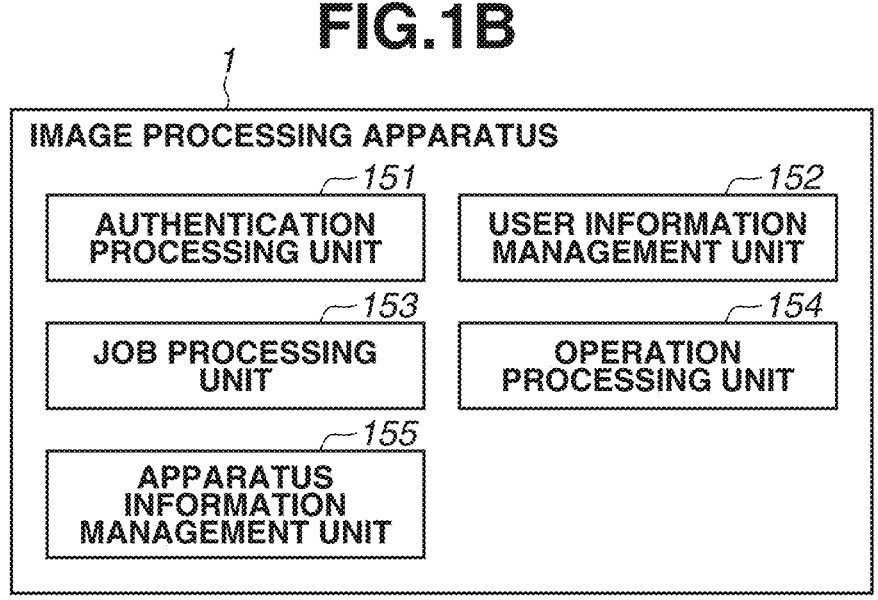

FIGS. 1A and 1B are block diagrams each illustrating a configuration of an image processing apparatus 1 according to a first exemplary embodiment.

FIG. 1A is a block diagram illustrating a hardware configuration of the image processing apparatus 1.

A control unit 10 controls operation of each unit of the image processing apparatus 1. The control unit 10 includes a central processing unit (CPU) 100, a local area network (LAN) 11, a communication unit 101, a random access memory (RAM) 102, a hard disk drive (HDD) 103, a read only memory (ROM) 104, a timer 105, and a fax unit 106. The CPU 100 controls the entire control unit 10. The LAN 11 is a network for exchanging data with an external apparatus, and the image processing apparatus 1 is connected to the Internet via the LAN 11. The communication unit 101 transmits and receives data via the LAN 11. The RAM 102 provides a system work memory for the CPU 100 to operate. The HDD 103 can be a storage medium such as a magnetic disk, an optical medium, or a flash memory. The HDD 103 can store data such as document data and setting data, and can be located external to the image processing apparatus 1. An external server, a personal computer (PC), or the like can be used as a data storage apparatus via the communication unit 101. The ROM 104 is a boot ROM and stores a boot program of a system. The CPU 100 loads a program installed in the HDD 103 into the RAM 102 by the boot ROM implemented by the ROM 104, and performs various kinds of control based on the program. The timer 105 measures the time based on an instruction of the CPU 100, and notifies the CPU 100 by an interrupt or the like when the time specified by the instruction has elapsed. The fax unit 106 transmits and receives fax data via a telephone line 14.

An operation unit 12 is controlled by the control unit 10, and includes a display unit 120 and an input unit 121. The display unit 120 is a display device for displaying information about the image processing apparatus 1 to a user. The input unit 121 accepts operation inputs from the user via an interface such as a touch panel, a mouse, a camera, a voice input system, or a keyboard.

An image processing unit 13 is controlled by the control unit 10, and includes an image analysis unit 130, an image generation unit 131, and an image output unit 132. The image analysis unit 130 analyzes the structure of an original image, and extracts necessary information from an analysis result. The image generation unit 131 generates image data by digitizing an image of an original document by reading (e.g., scanning) the original document, and stores the generated image data in the HDD 103. The image generation unit 131 can also generate document image data in a different format using information analyzed by the image analysis unit 130. The image output unit 132 outputs image data stored in the HDD 103 and the like. Examples of a method for outputting the image data include printing the image data of an original document on a sheet, transmitting the image data via the communication unit 101 to an external device, a server, a facsimile apparatus, or the like connected by a network, and storing the image data in a storage medium connected to the image processing apparatus 1.

FIG. 1B is a block diagram illustrating a software configuration of the image processing apparatus 1. The image processing apparatus 1 includes an authentication processing unit 151, a user information management unit 152, a job processing unit 153, an operation processing unit 154, and an apparatus information management unit 155, as functions thereof. The CPU 100 loads a program installed in the HDD 103 into the RAM 102 by the boot ROM implemented by the ROM 104, and each of these function units is implemented as a function based on the loaded program.

The authentication processing unit 151 receives a request for login/logout from a user, and performs processing for identifying the user who uses the image processing apparatus 1 by user authentication. The authentication can be performed by an external authentication server.

The user information management unit 152 manages information about the user identified by the authentication processing unit 151. For example, the user information management unit 152 manages a language (e.g., English, Japanese, or the like) to be used by each user, and can switch between languages depending on a user who has logged in. The user information management unit 152 can manage print jobs received from an external apparatus via the communication unit 101 for each user who has input a job.

The job processing unit 153 controls the image processing apparatus 1 to perform processing such as processing of various jobs to be executed in the image processing apparatus 1. Specifically, the job processing unit 153 executes a scan job by controlling the image generation unit 131, executes a print job by controlling the image output unit 132, and executes a transmission job by controlling the communication unit 101.

The operation processing unit 154 displays various kinds of information for a user by controlling the display unit 120. The operation processing unit 154 receives an operation instruction input by the user from the input unit 121 and processes the received operation instruction.

The apparatus information management unit 155 manages information about the entire image processing apparatus 1. Specific examples include an Internet Protocol (IP) address assigned to an apparatus and a setting value common to all users using the apparatus. The apparatus information management unit 155 can also manage information similar to the information managed by the user information management unit 152. For example, in a case where English is set in the apparatus information management unit 155 as a common setting for a language to be used, an English message is presented to a user who has not set any specific language to use when such a user uses the image processing apparatus 1. In a case where a user has set Japanese as a language to use, a Japanese message can be presented to the user.

Figure 2:
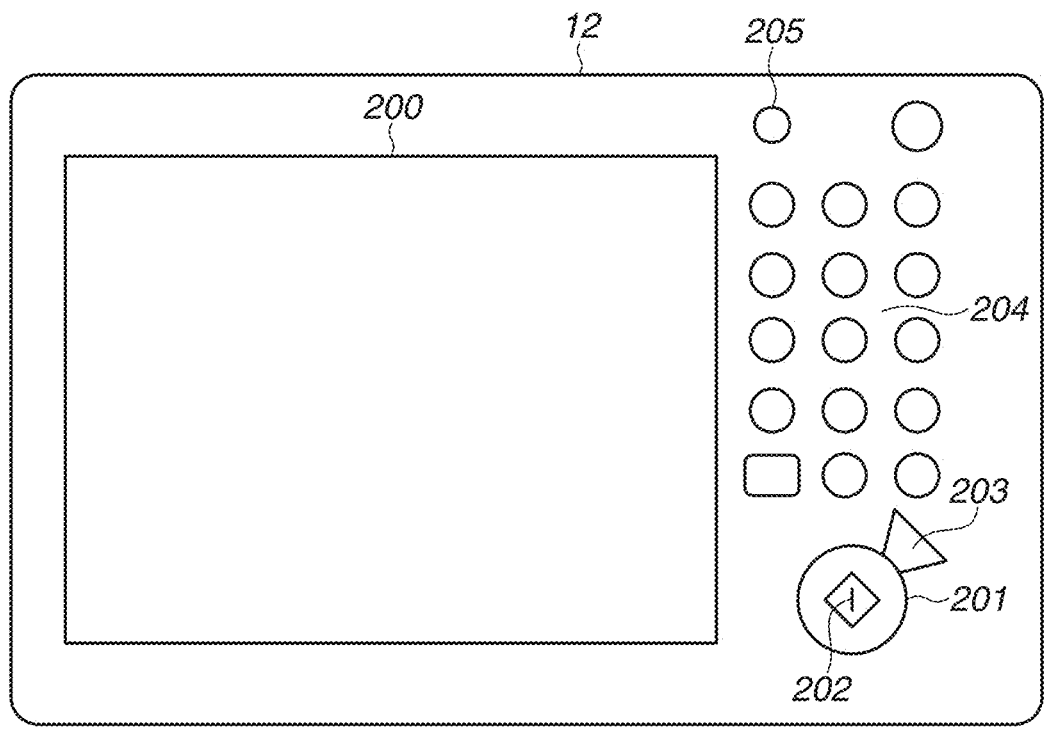
FIG. 2 is an external view of an operation unit according to the present exemplary embodiment.

FIG. 2 is a schematic view of the operation unit 12 according to the present exemplary embodiment.

A touch panel 200 in the present exemplary embodiment is a liquid crystal display unit in which a touch panel sheet is affixed onto a liquid crystal. The touch panel 200 displays an operation screen and software keys. When a displayed key is selected, the touch panel 200 conveys position information corresponding to the selected key to the CPU 100. Thus, the touch panel 200 in this case functions as the display unit 120 in FIG. 1 and also functions as the input unit 121.

Next, various keys and buttons to be operated by the user will be described. A start key 201 is used, for example, when the user provides an instruction to start operation for reading an image of an original document or operation for outputting an image. An LED 202 of green and red colors is disposed in a central part of the start key 201, and indicates whether the start key 201 is in a usable state based on the color. A stop key 203 is a key for stopping the operation in progress. A numeric keypad 204 is composed of numeric buttons and character buttons for providing an instruction to set a number of copies and an instruction to switch between screens of the touch panel 200. A user mode key 205 is selected in a case where a device set-up is to be performed.

Hereinafter, a description "a screen is displayed" indicates that the CPU 100 calls screen display data and a display control program corresponding to the screen from the HDD 103 or the RAM 102 and displays the screen display data on the display unit 120. Similarly, a description "a user presses XX" or the like indicating that an operation is performed on the touch panel or any of various keys indicates that the CPU 100 performs processing to be executed based on the display control program using position information notified from the input unit 121 and display control data, when a button or a list displayed on a screen or any of various keys is selected by the user.

Figure 3:
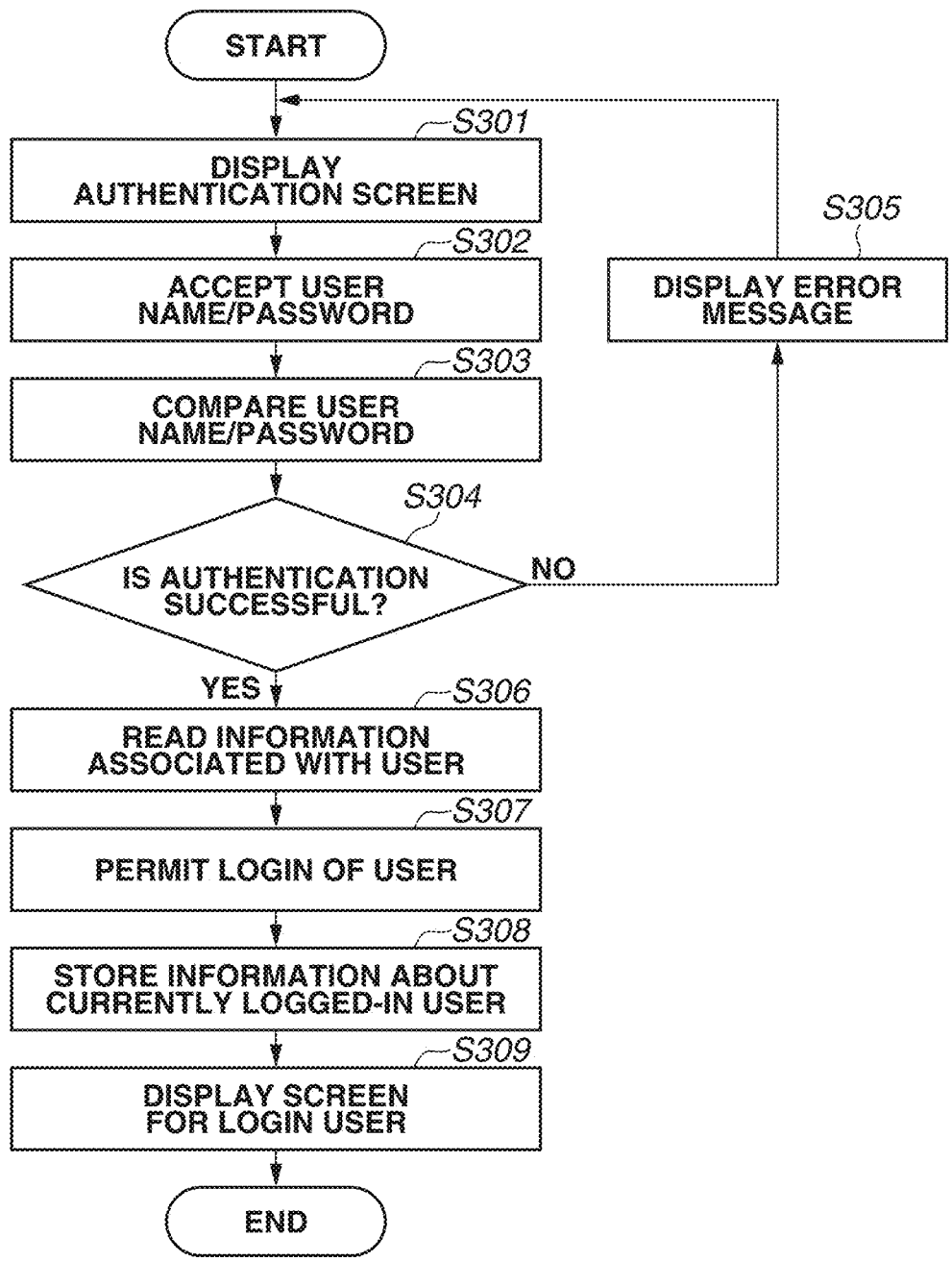
FIG. 3 is a flowchart illustrating login processing performed upon activation of the image processing apparatus according to the present exemplary embodiment.

FIG. 3 is a flowchart illustrating processing according to the present exemplary embodiment in which a user logs into the image processing apparatus 1 upon activating the image processing apparatus 1 and the image processing apparatus 1 displays a screen to the logged in user. The CPU 100 reads a control program stored in the ROM 104 or the HDD 103 into the RAM 102 and executes the control program, so that each process illustrated in the flowchart is implemented.

Figure 4:
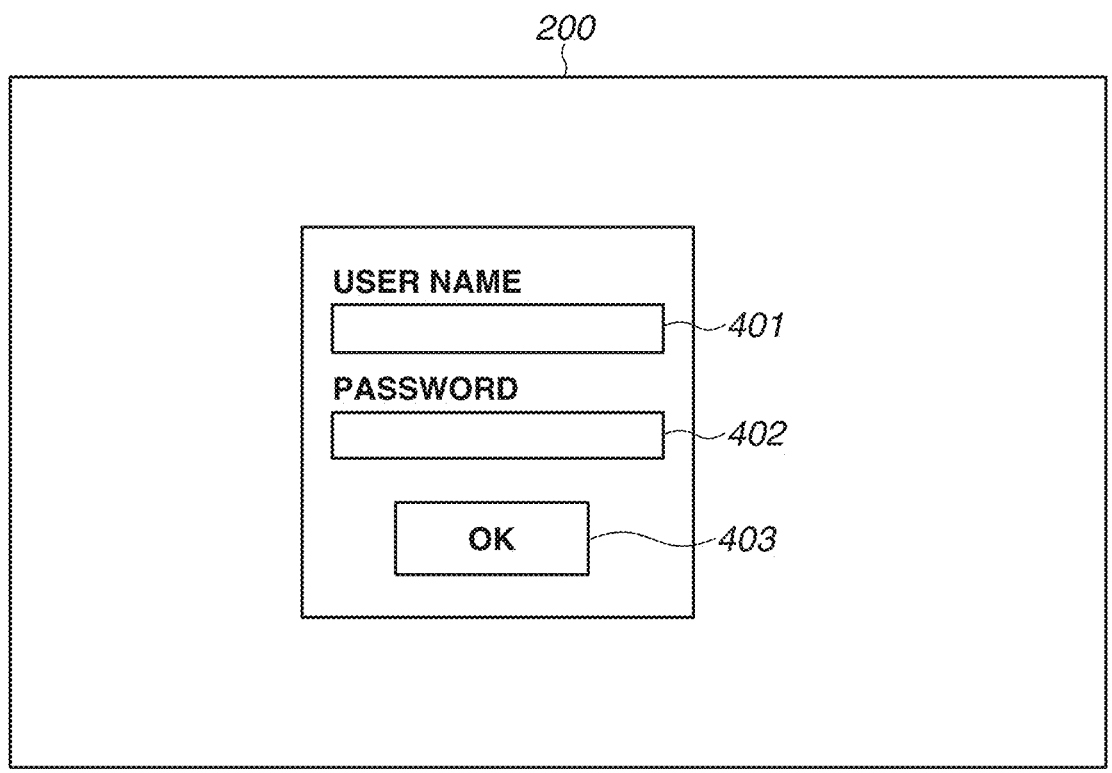
FIG. 4 is a schematic diagram illustrating an authentication screen according to the present exemplary embodiment.

In step S301, in a case where a user authentication function is enabled in the image processing apparatus 1 of the present exemplary embodiment, the CPU 100 displays an authentication screen for inputting login information on the touch panel 200 upon activation of the main body. FIG. 4 illustrates an example of the displayed authentication screen. The authentication screen has an area for inputting a user name 401 and a password 402. In step S302, the image processing apparatus 1 enters a state of waiting for a user name and a password to be input after displaying the authentication screen. The user inputs a user name and a password registered beforehand, and selects an OK button 403. In step S303, the CPU 100 compares the input user name and password with a user name and a password stored in the HDD 103 to determine if these match each other. In step S304, the CPU 100 determines whether the authentication is successful based on a result of the comparison. In a case where the input user name and password are incorrect (NO in step S304), the processing proceeds to step S305. In step S305, the CPU 100 displays an error message on the touch panel 200, and displays the authentication screen again. In a case where the input user name and password match the stored user name and password (YES in step S304), the processing proceeds to step S306. In step S306, the CPU 100 calls information associated with the user and stored in the HDD 103. In step S307, upon completion of the call, the CPU 100 permits the login of the user. In step S308, the CPU 100 stores the information about the user in the HDD 103 as a currently logged-in user. In step S309, the CPU 100 displays a home screen reflecting the called information about the login user on the touch panel 200.

Figure 5A:
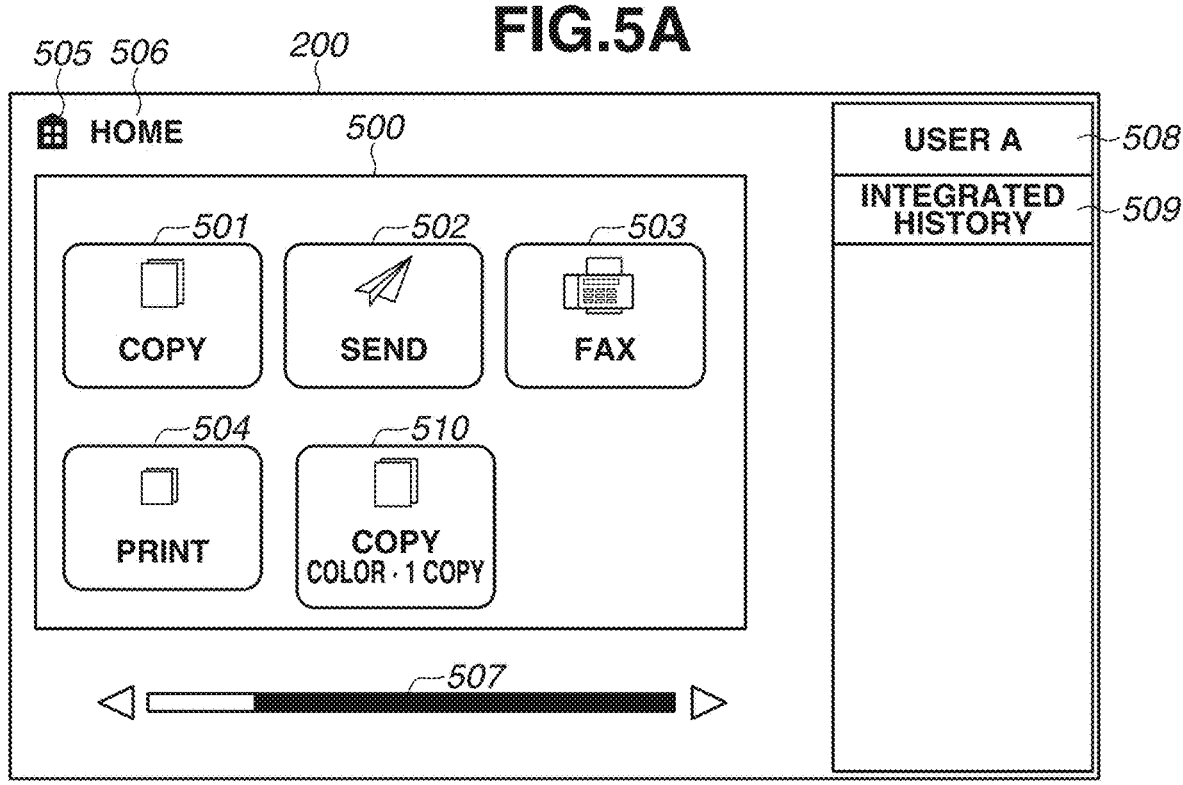
FIGS. 5A, 5B, 5C, and 5D are schematic diagrams each illustrating a home screen according to the present exemplary embodiment.

FIG. 5A illustrates a home screen displayed to a user (a login user) who has logged into the image processing apparatus 1, and is a screen for selecting a function to be executed. A menu 500 for starting each function or application is displayed in the home screen reflecting the setting of the login user. The menu 500 includes application buttons 501 to 504 for starting an application based on a default setting value. The copy button 501 is a button for executing a copy application, and a setting screen for executing a copy process is displayed when this button is selected. The transmission (send) button 502 is a button for executing a transmission application for transmitting an image to a set address, and a setting screen for a transmission process is displayed when this button is selected. The fax button 503 is a button for executing a fax application, and a setting screen for executing a fax process is displayed when this button is selected. The print button 504 is a button for executing a print application, and a setting screen for executing a print process is displayed when this button is selected.

The menu 500 also includes a custom button 510 for starting an application using a setting value set beforehand by the user. This is a button registered beforehand by the login user, and can be displayed only to the login user or can also be displayed to users other than the login user. A slider bar 507 is a display object for performing page transition of the menu 500. When the user slides the slider bar 507, selects an arrow, or flicks a portion in the menu 500, the CPU 100 calls an application button or a custom button registered in the next area from the HDD 103 in response to such an input, and displays the called button.

Figure 5B:
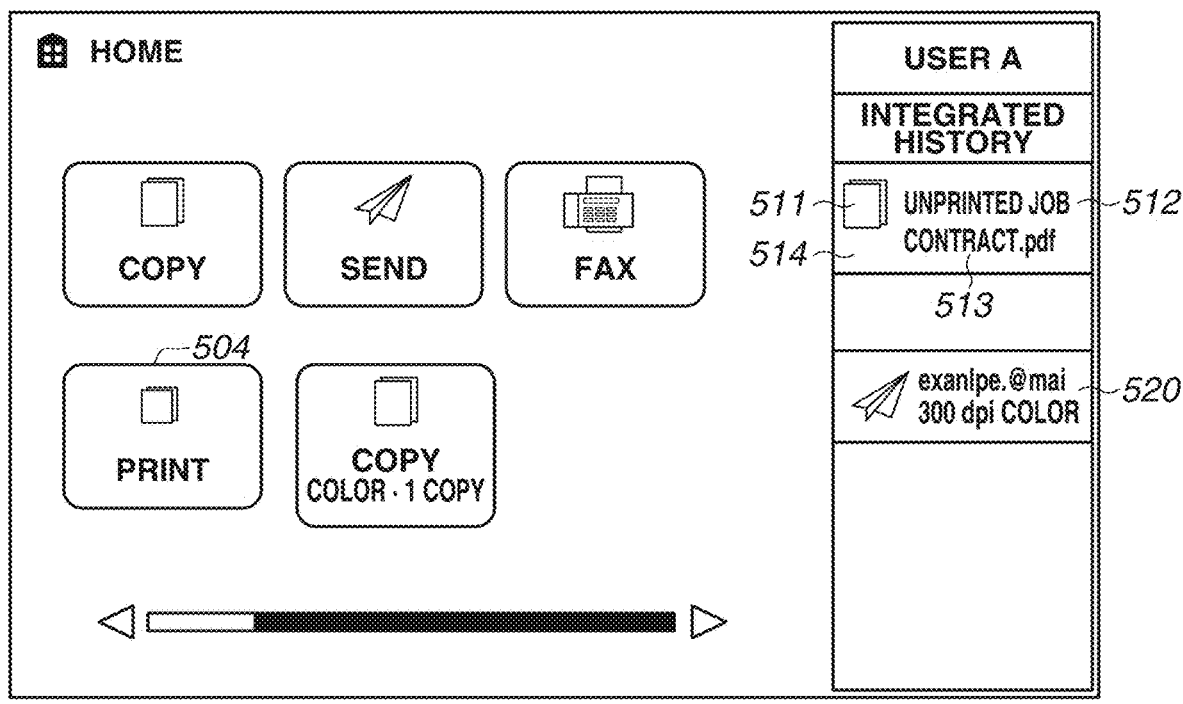

The currently logged-in user is displayed in an area 508 for displaying a user name. In the present exemplary embodiment, a case where "user A" is currently logged in is illustrated. The user can be logged out by selecting the area 508. A button 505 is a button for displaying the home screen. In a display area 506, a word indicating that the screen being displayed is the home screen is displayed. As described below, an integrated history 509 is an area for displaying a history button for calling settings of jobs of a plurality of applications executed in the image processing apparatus 1. As illustrated in FIG. 5B, a history button 520 for calling a setting of an executed job is displayed in the integrated history 509. When the history button 520 is selected, a screen for an application reflecting the setting, e.g., a job setting screen, is displayed (not illustrated).

Figure 5C:
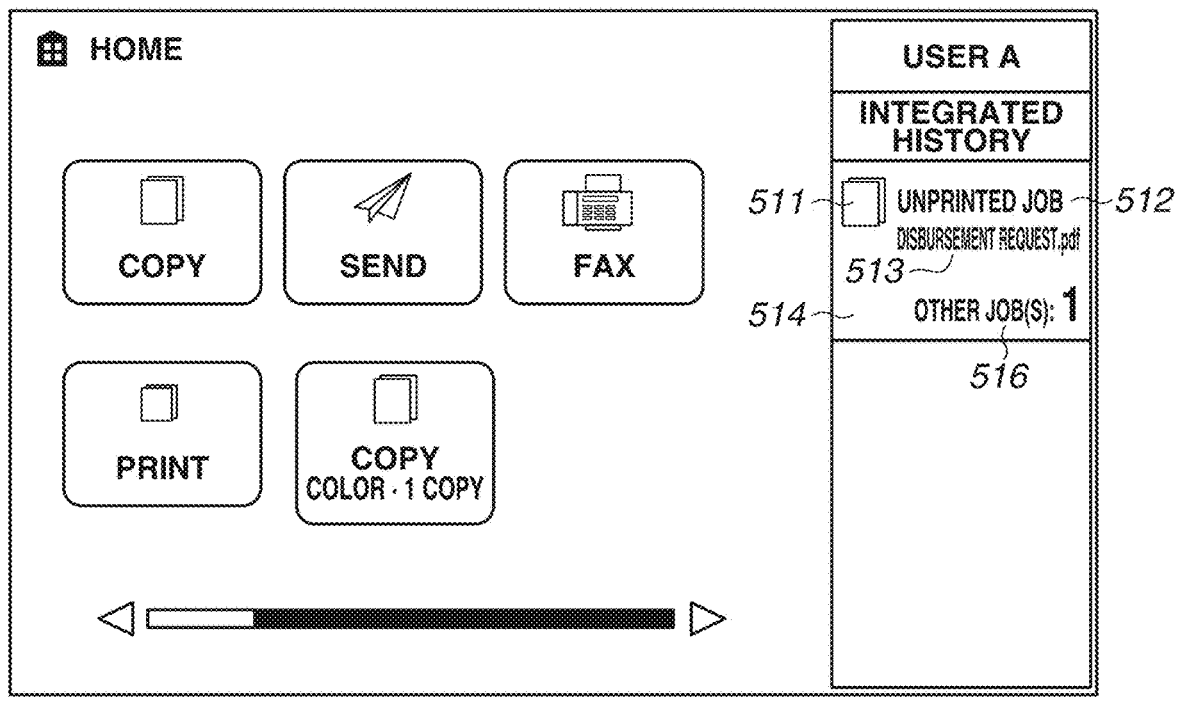

As illustrated in FIG. 5B, the integrated history 509 also displays a print notification button 514 for notifying an unprinted job that is a print job associated with the login user. The print notification button 514 includes text 512 indicating the print notification, an icon 511, and a file name 513. In a case where there is a plurality of unprinted jobs, text 516 indicating that there is a plurality of print jobs is displayed as illustrated in FIG. 5C.

In a case where the authentication function of the image processing apparatus 1 is enabled, the area of the integrated history 509 displays only a history of a setting of a job executed by the login user, and a print notification button associated with the login user. In a case where no job has been executed, in a case where no corresponding print job is stored, or in a case where a history button in the integrated history 509 is deleted, no button is displayed in the area of the integrated history 509 as in FIG. 5A. The subsequent operation and display of the integrated history 509 are executed by the CPU 100 based on a program for the integrated history 509 stored in the HDD 103. In addition, data to be used in the integrated history 509 is stored in the RAM 102 and the HDD 103.

Figure 6A:
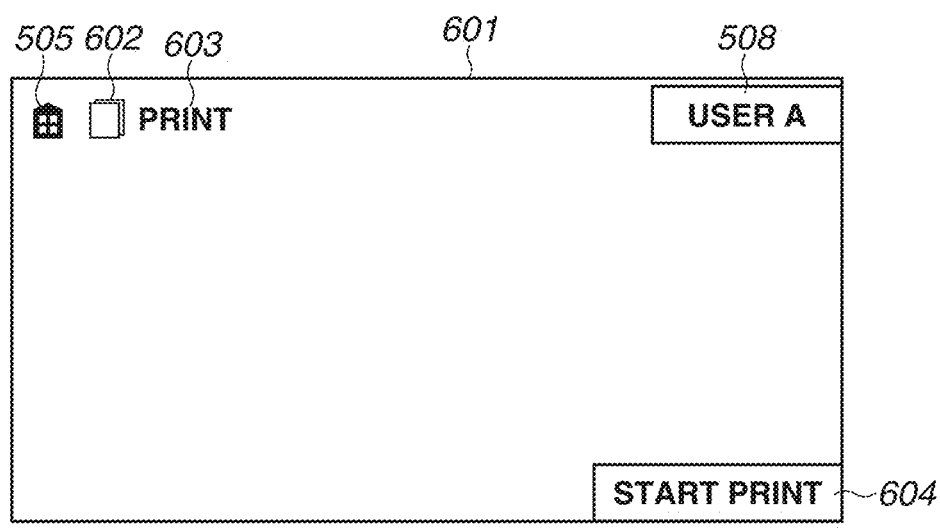
FIGS. 6A, 6B, 6C, 6D, and 6E are schematic diagrams each illustrating a print application screen according to the present exemplary embodiment.
Figure 6B:
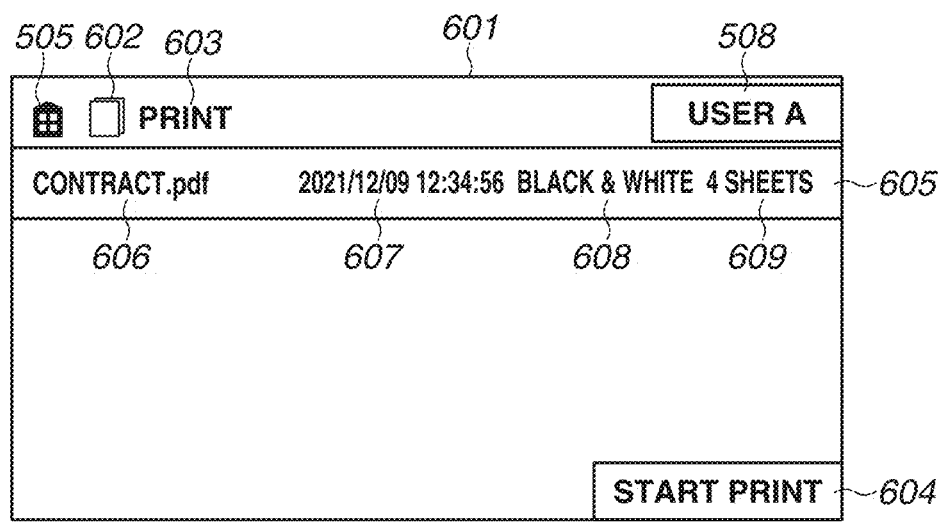
Figure 6C:
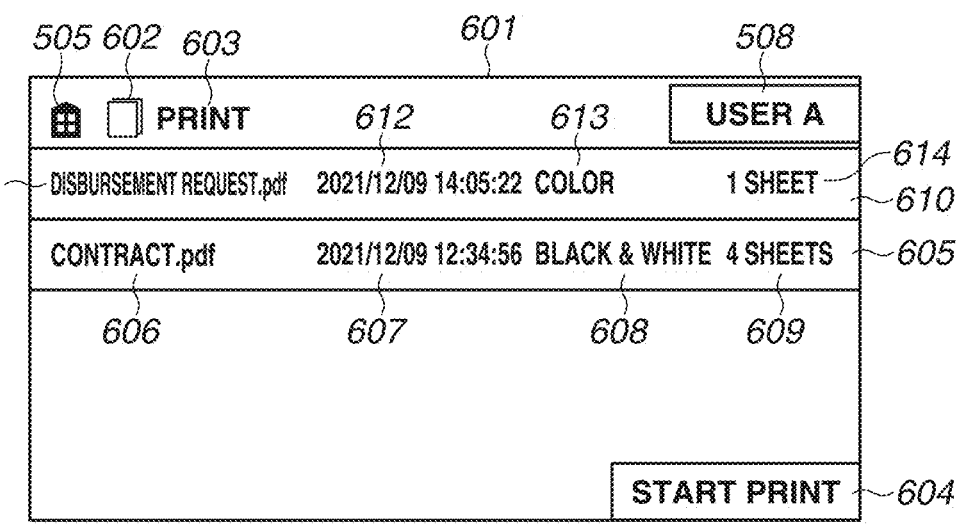
Figure 6D:
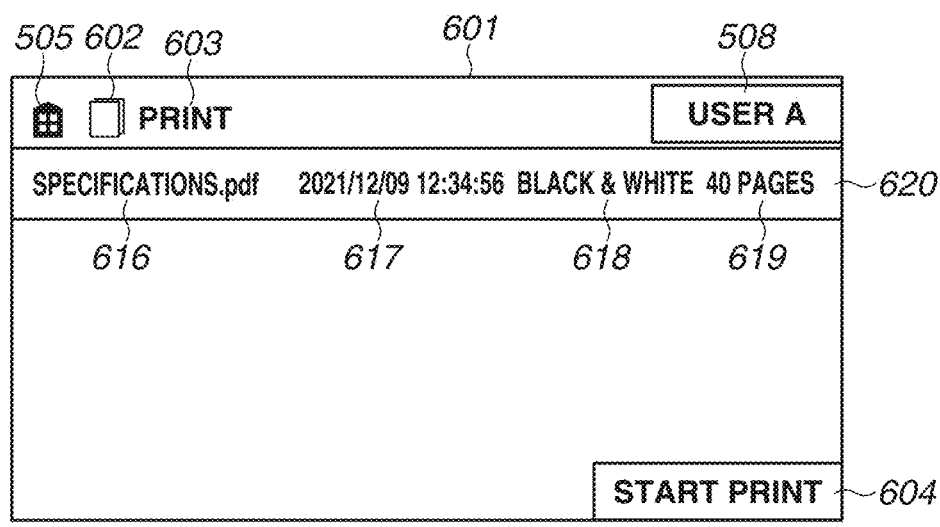
Figure 6E:
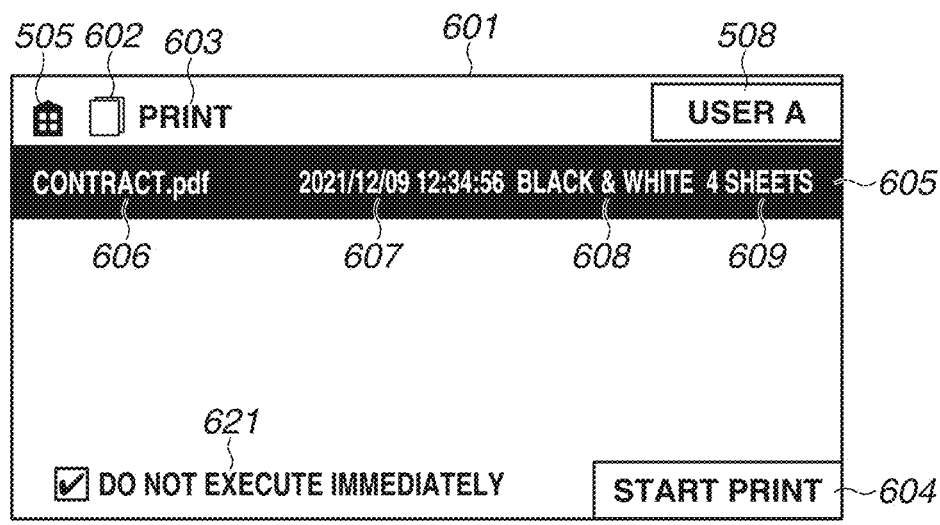

FIGS. 6A, 6B, 6C, 6D, and 6E each illustrate an example of a screen for the print application. When the print button 504 or the print notification button 514 is selected by the user in the menu 500, the CPU 100 calls the print application from the HDD 103, and displays a print application screen 601 in FIGS. 6A to 6E on the touch panel 200. The subsequent operation and display of the application are executed by the CPU 100 based on an application program in the HDD 103. Data to be used in each application is stored in the RAM 102 and the HDD 103 in association with each application. The print application screen 601 includes the button 505 for returning to the home screen, an icon 602 indicating that the current screen is a screen for the print application, a title 603, the user name area 508, a print start button 604, and an area for displaying a list of stored print jobs, as illustrated in FIG. 6A. FIG. 6B illustrates the print application screen 601 displayed in a case where one print job is stored. When a print job 605 is selected by the user in this screen, the selected print job 605 is highlighted as illustrated in FIG. 6E. When the print start button 604 is selected in this state, the selected print job 605 is executed. A configuration in which a setting screen for changing the setting of the selected print job is displayed can be adopted.

FIGS. 7A, 7B, 7C, and 7D each illustrate a table indicating information about a print job stored in the image processing apparatus 1. A print job input by a user who has logged into the image processing apparatus 1, e.g., a print job associated with the user A is illustrated. It is not necessary for the information about the print job to be stored in the image processing apparatus 1, and can be stored in, for example, an external server.

A table 710 consists of a date and time 701 of the input of a print job into the image processing apparatus 1, a file name 702, a color setting 703 indicating color print or black-and-white print, the number of sheets 704 to be printed, and a file storage address 705. FIG. 7A is a table illustrating a case where no print job associated with the user is stored in the image processing apparatus 1. When the print button 504 or the print notification button 514 is selected in this state, the print application screen 601 illustrated in FIG. 6A is displayed.

FIG. 7B is a table illustrating a case where one print job (a print job 711) associated with the user is stored in the image processing apparatus 1. When the print button 504 or the print notification button 514 is selected in this state, the print application screen 601 displaying one print job as illustrated in FIG. 6B is displayed. The print job 605 in FIG. 6B indicates the stored print job, and reference numerals 606, 607, 608, and 609 indicate a file name, a date and time, a color setting, and the number of sheets to be printed, respectively.

FIG. 7C is a table illustrating a case where two print jobs (the print job 711 and a print job 712) associated with the user are stored in the image processing apparatus 1. When the print button 504 or the print notification button 514 is selected in this state, the print application screen 601 displaying two print jobs as illustrated in FIG. 6C is displayed. In FIG. 6C, in addition to the contents of the screen in FIG. 6B, a stored print job 610 is displayed, and reference numerals 611, 612, 613, and 614 indicate a file name, a date and time, a color setting, and the number of sheets to be printed, respectively. Similarly, the print application screen 601 corresponding to FIG. 7D is illustrated in FIG. 6D. The user selects a desired print job from the print application screen 601 displaying a list of print jobs associated with the user, and provides an instruction to execute the selected print job.

Figure 10A:
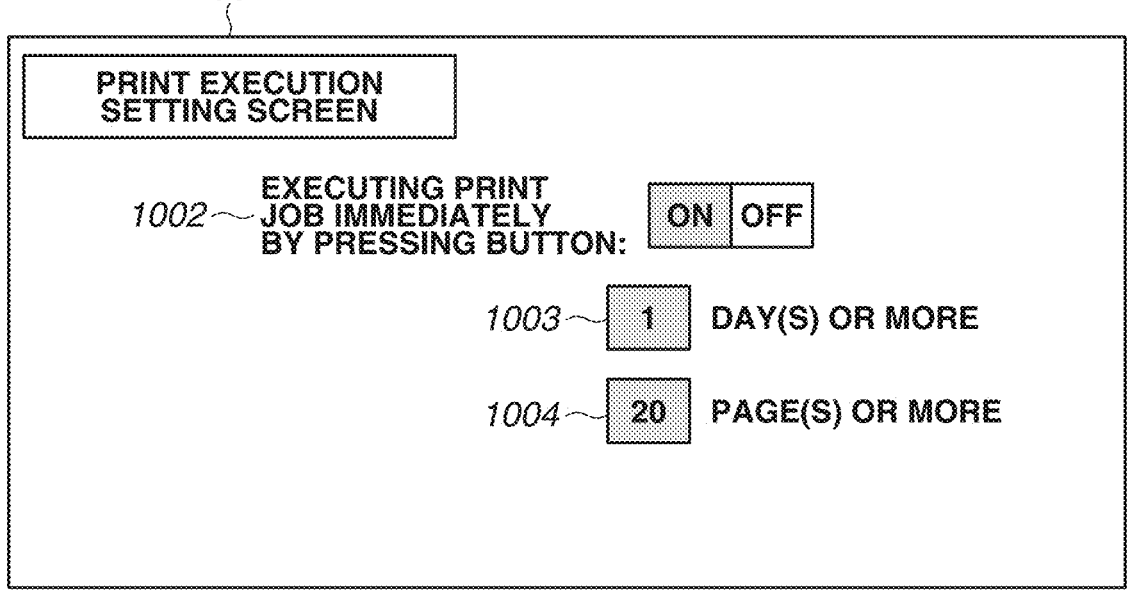
FIGS. 10A and 10B are schematic diagrams each illustrating a print execution setting screen according to the present exemplary embodiment.

FIG. 10A is a print execution setting screen for making a setting about print execution. This is a screen for making a setting 1002 for immediately executing the print process (immediate execution), and the screen is displayed in a case where the print button 504 or the print notification button 514 is selected in the state where only one print job associated with the user is stored in the image processing apparatus 1. In other words, the immediate execution refers to execution of a print job without selecting a job or providing an instruction to execute a selected job in the print application screen 601. The setting 1002 can be changeable only by a user having predetermined authority, such as administrator authority. In a case where the setting 1002 is on, the print process is immediately executed if there is only one print job associated with the user when the print button 504 or the print notification button 514 for starting the print application is selected. Even in the case where the setting 1002 is on, the print application screen 601 is displayed if there is a plurality of print jobs associated with the user when the print button 504 or the print notification button 514 is selected. In a case where the setting 1002 is off, the print application screen 601 is displayed regardless of the number of stored print jobs associated with the user. In other words, as illustrated in FIGS. 6A to 7D, the print application screen 601 for selecting a print job to be executed is displayed each time the print button 504 or the print notification button 514 is selected.

A time setting 1003 and a page setting 1004 are settings displayed when the setting 1002 is turned on, and these are settings for limiting the immediate execution. In a case where the print button 504 or the print notification button 514 is selected after the time set in the time setting 1003 has elapsed since the input of a print job into the image processing apparatus 1 by the user, the print job is not immediately executed, and the print application screen 601 is displayed. In addition, a print job for pages exceeding the number of pages set in the page setting 1004 is not immediately executed. The time setting 1003 and the page setting 1004 can each be changed by the user to a desired setting value. The setting described here can be stored as a user setting for each user, or can be stored as an apparatus setting common to users who use the image processing apparatus 1. The setting described here can be settable in the print application screen 601 as indicated by a setting 621 in FIG. 6E.

Figure 8:
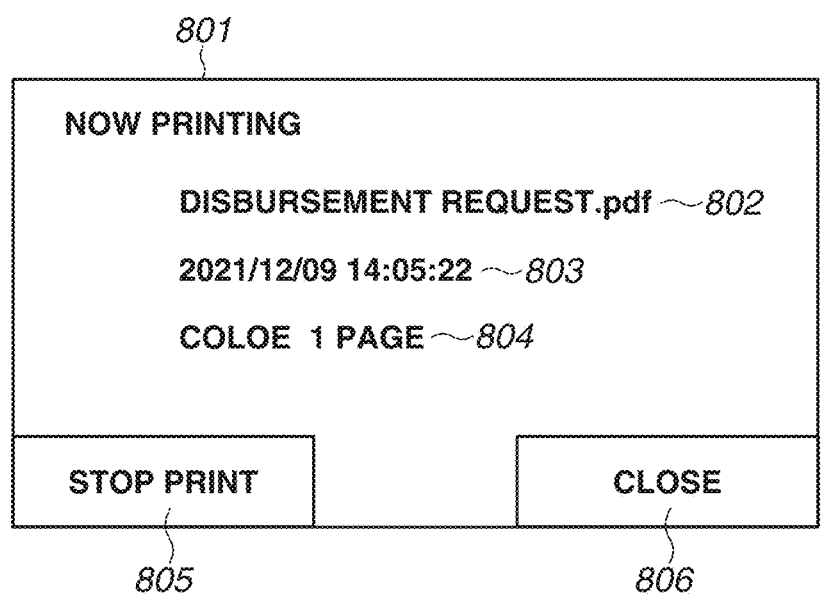
FIG. 8 is a schematic diagram illustrating a print execution screen according to the present exemplary embodiment.

FIG. 8 illustrates an example of a print execution screen displayed during execution of a print job by the image processing apparatus 1. This screen is displayed when, for example, the print start button 604 is selected in the print application screen 601.

A print execution screen 801 displays a file name 802, a date and time 803 of the input of a print job, and a color setting/the number of sheets to be printed 804 as information about a print job being executed.

The print execution screen 801 includes a stop print button 805 to provide an instruction to stop the printing, and a close button 806 to provide an instruction to only close the print execution screen 801 while continuing execution of the printing. When the button 806 is selected by the user, or when printing is completed, the print execution screen 801 returns to a screen displayed before the print execution screen 801 is displayed.

FIG. 9 is a flowchart illustrating processing when the print button 504 or the print notification button 514 is selected. The CPU 100 reads a control program stored in the ROM 104 or the HDD 103 into the RAM 102, and executes the control program, so that each process illustrated in the flowchart is implemented.

In step S901, when the print button 504 or the print notification button 514 is selected, the apparatus information management unit 155 determines whether the setting 1002 indicating immediate execution of print is on. In a case where the setting 1002 is on (YES in step S901), the processing proceeds to step S902. In a case where the setting 1002 is off (NO in step S901), the processing proceeds to step S907. In step S907, the operation processing unit 154 displays the print application screen 601 on the touch panel 200.

In step S902, the job processing unit 153 acquires print job information associated with a user who has logged into the image processing apparatus 1 from the user information management unit 152. Specifically, the job processing unit 153 acquires the information about the print job illustrated in any of FIGS. 7A to 7D.

In step S903, the job processing unit 153 determines whether the number of print jobs associated with the user is one based on the acquired print job information. In a case where the number of print jobs is one (YES in step S903), the processing proceeds to step S904, otherwise the processing proceeds to step S907. While the number of unexecuted print jobs is determined here, the number of print jobs stored in the image processing apparatus 1 and associated with the user can be determined.

In step S904, the job processing unit 153 determines whether one or more days have elapsed since the input of a target print job based on the acquired print job information. In a case where one or more days have elapsed (YES in step S904), the processing proceeds to step S907, otherwise the processing proceeds to step S905. The criterion for the determination here is one day based on the time setting 1003.

In step S905, the job processing unit 153 determines whether the number of pages in the target print job is 20 or more based on the acquired print job information. In a case where the number of pages is 20 or more (YES in step S905), the processing proceeds to step S907, otherwise the processing proceeds to step S906. The criterion for the determination here is 20 pages based on the page setting 1004.

In step S906, the job processing unit 153 executes one target print job, and the operation processing unit 154 displays the print execution screen 801. The job processing unit 153 may be configured to display a confirmation screen before executing the job in step S906 to confirm the process execution with the user. For example, the print job is executed when "YES" is selected in the confirmation screen, and the print application screen 601 is displayed when "NO" is selected. The job processing unit 153 may be configured to automatically execute the print process after automatically transitioning to the print application screen 601 in step S906.

The processing in the above-described flowchart enables switching between displaying the screen for the print function and executing a print job immediately depending on the number of print jobs associated with the user when the print button 504 or the print notification button 514 is selected. Thus, it is possible to prevent execution of a print job not intended by a user while improving the operability for the user. In the above-described example, switching between immediately executing the print job and not immediately executing the print job is performed depending on whether the number of print jobs is one, but the number thereof is not limited thereto and can be settable by the user.

For example, a print job input into the image processing apparatus 1 by a user within ten minutes can be counted as one print job. In a case where only a print job input within a predetermined period is stored in the image processing apparatus 1, the stored print job is immediately executed. In a case where, in addition to the print job input within the predetermined period, a print job input outside the predetermined period is also stored in the image processing apparatus 1, the print job is not immediately executed. The above-described exemplary embodiment describes an example in which a print job is not immediately executed in a case where the elapsed time and the number or pages each satisfy a predetermined condition even if the number of print jobs is one. The condition for not immediately executing a print job is not limited to these conditions, and can be a secure print for which authentication is necessary, a print job being transmitted from a predetermined apparatus, or the like.

When the processing at the time of selecting the button is changed depending on the number of print jobs as in the first exemplary embodiment, the user can in some instances be confused. In a second exemplary embodiment, a configuration in which information indicating a state where a print job is to be immediately executed when a button is selected is displayed in the button will be described. The configuration according to the present exemplary embodiment is similar to the configuration according to the first exemplary embodiment, and thus only a difference will be described.

Figure 5D:
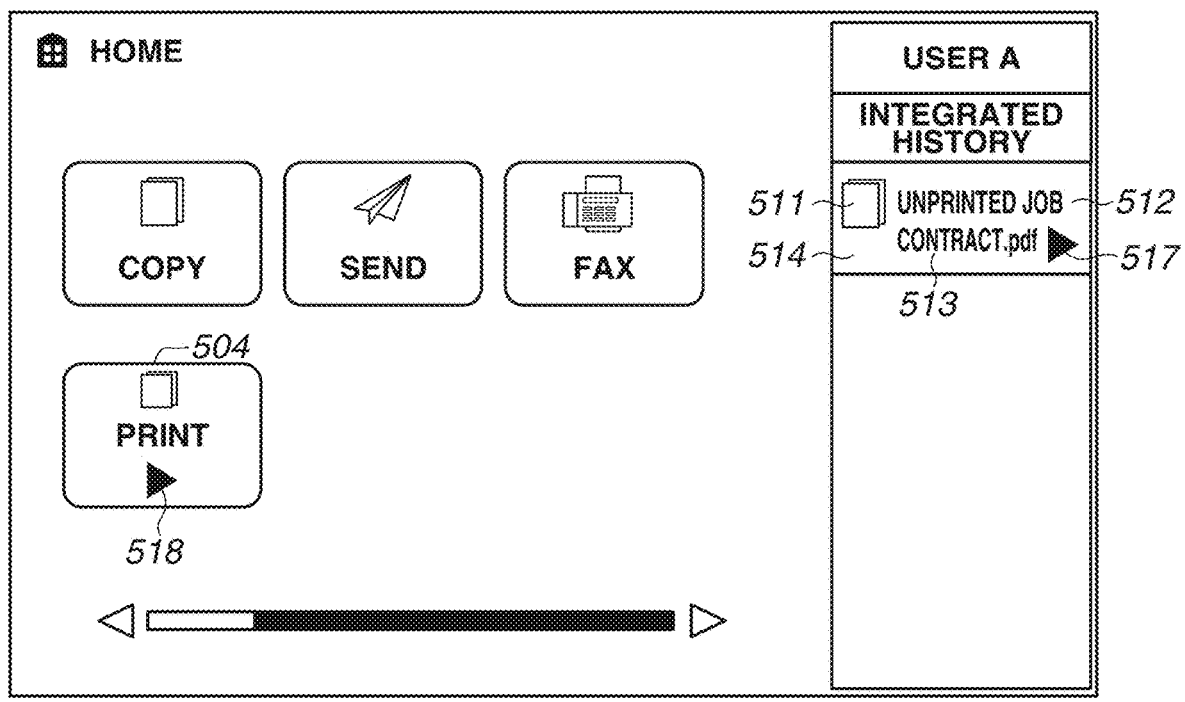

FIG. 5D illustrates an example of a home screen according to the present exemplary embodiment. A print button 504 and a print notification button 514 display an icon 518 and an icon 517, respectively, for enabling a user to recognize a state where a print job is to be immediately executed when the button is selected. The icons 517 and 518 are not displayed in a case where the current state is not the state where a print job is to be immediately executed when the button is selected. For example, the icon 517 and the icon 518 are displayed if there is only one print job associated with the user, and the icon 517 and the icon 518 are not displayed if there are two or more print jobs associated with the user.

The above-described exemplary embodiment enables a user to recognize the state where a print job is to be immediately executed in response to button selection.

In the first exemplary embodiment, if a predetermined state is established, a print job is immediately executed in a case where either the print button 504 or the print notification button 514 is selected. A third exemplary embodiment describes an example in which a print job is immediately executed when a print button 504 or a print notification button 514 is selected, and a print job is not immediately executed when the other is selected. The configuration according to the present exemplary embodiment is similar to the configuration according to the first exemplary embodiment, and thus only the difference will be described.

Figure 10B:
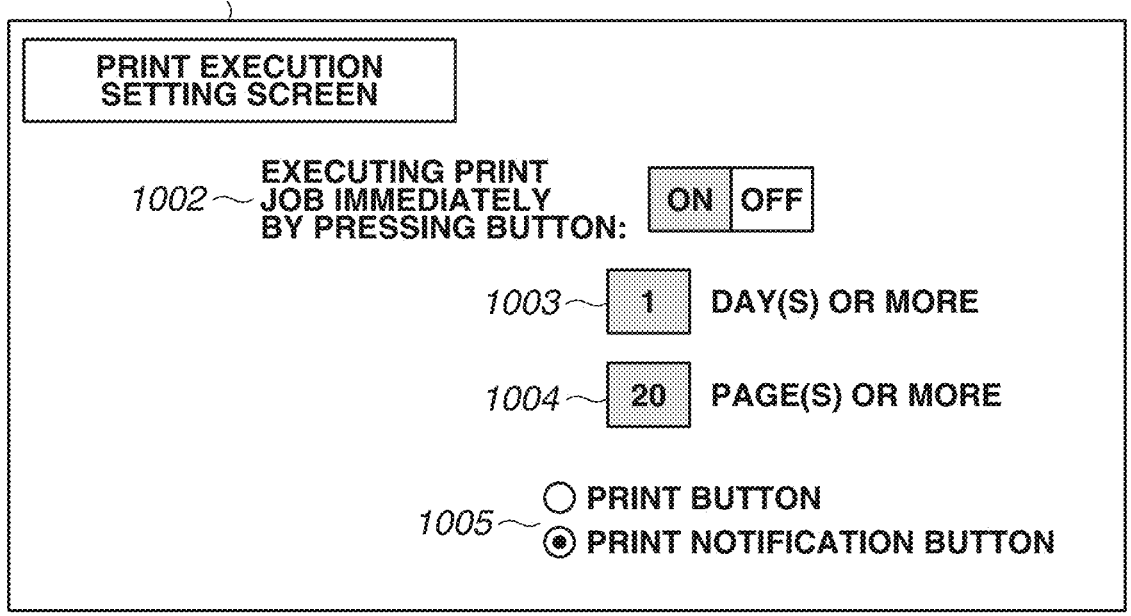

FIG. 10B illustrates an example of a print execution setting screen 1001 according to the present exemplary embodiment. A button selection setting 1005 is added to the screen in FIG. 10A. A case is illustrated where the print notification button 514 is selected, and a print job is to be immediately executed when the print notification button 514 is selected in a state where a predetermined condition is satisfied. For the print button 504 that is not selected, a print job is not immediately executed even if the condition is satisfied, and the print application screen 601 is displayed each time.

The above-described exemplary embodiment enables setting whether to immediately execute a print job for each button.

In the above-described example, the number of print jobs associated with a user is considered. However, a print job associated with a user cannot be identified in a case where the authentication function of the image processing apparatus 1 is disabled. Thus, the processing at the time of selecting the button can be changed depending on whether there is one unexecuted print job in the image processing apparatus 1.

While the exemplary embodiments are described above in detail, the exemplary embodiments can be embodied as, for example, a system, an apparatus, a method, a program, or a recording medium (a storage medium). Specifically, the exemplary embodiments can be applied to a system including a plurality of apparatuses (e.g., a host computer, an interface device, an imaging apparatus, and a web application), or can be applied to an apparatus consisting of one device.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s)

and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While exemplary embodiments have been described, these embodiments are not seen to be limiting. The scope of the following claims is to be accorded the broadest interpretation so as to encompass all such modifications and equivalent structures and functions.

What is claimed is:

1. An image processing apparatus comprising:
    one or more processors; and
    one or more memories having instructions stored thereon, when executed by the one or more processors, cooperating with the one or more processors cause the image processing apparatus to:
        accept a selection of a predetermined button; and
        perform control to display, in a case where the selection of the predetermined button is accepted and a number of jobs of the image processing apparatus is greater than a predetermined number, a screen relating to the job of the number greater than the predetermined number, and to execute, in a case where the selection of the predetermined button is accepted and the number of jobs of the image processing apparatus is equal to the predetermined number, the predetermined number of jobs.

2. The image processing apparatus according to claim 1, wherein the one or more memories further stores a job, and
    wherein the control is performed depending on a number of stored jobs stored in the one or more memories and associated with the user.

3. The image processing apparatus according to claim 1, wherein, in a case where a predetermined period has elapsed since input of a job associated with the user, the screen for selecting a job to be executed is displayed based on selection of the predetermined button regardless of the number of jobs.

4. The image processing apparatus according to claim 1, wherein, in a case where a number of pages of a job associated with the user satisfies a predetermined condition, the screen for selecting a job to be executed is displayed based on selection of the predetermined button regardless of the number of jobs.

5. The image processing apparatus according to claim 1, wherein the predetermined button is displayed in a home screen for selecting a function to be executed.

6. The image processing apparatus according to claim 1, wherein the predetermined button is a button for starting a print application.

7. The image processing apparatus according to claim 6, wherein the predetermined button is a button for executing the print application based on a default setting value.

8. The image processing apparatus according to claim 1, wherein the predetermined button is a button for notifying that a job associated with the user is present.

9. The image processing apparatus according to claim 1, wherein the predetermined button is not displayed in a case where no job is associated with the user.

10. The image processing apparatus according to claim 1, wherein selection of a job is accepted in the screen for selecting a job to be executed, and the job is executed in a case where an execution instruction is accepted.

11. The image processing apparatus according to claim 1, wherein, in a case where another predetermined button is in a state where a job is to be executed based on selection of the predetermined button, the state is displayed with respect to the another predetermined button.

12. The image processing apparatus according to claim 1, further comprising a display configured to display a setting screen for setting whether the control is to be performed.

13. The image processing apparatus according to claim 1, wherein the screen relating to the job of the number greater than the predetermined number is a screen for selecting a job to be executed.

14. The image processing apparatus according to claim 1, wherein the one or more processors and the one or more memories further cooperating to perform control to display, in a case where the selection of the predetermined button is accepted and the number of jobs of the image processing apparatus is more than one, a screen for selecting a job to be executed, and execute, in a case where the selection of the predetermined button is accepted and the number of jobs of the image processing apparatus is one, the one job.

15. The image processing apparatus according to claim 1, wherein the one or more processors and the one or more memories further cooperating to perform control to:
    identify a user of the image processing apparatus; and
    display, in a case where the selection of the predetermined button is accepted and the number of jobs associated with the identified user is more than one, a screen for selecting a job to be executed, and execute, in a case where the selection of the predetermined button is accepted and the number of jobs associated with the identified user is one, the one job.

16. An image processing apparatus comprising:
    one or more processors; and
    one or more memories having instructions stored thereon, when executed by the one or more processors, cooperating with the one or more processors cause the image processing apparatus to:
        accept a selection of a predetermined button;
        perform control to display, in a case where the selection of the predetermined button is accepted and the number of jobs of the image processing apparatus is more than one, a screen for selecting a job to be executed, and to display, in a case where the selection of the predetermined button is accepted and the number of jobs of the image processing apparatus is one, a confirmation screen for prompting a user to confirm execution of the one job.

17. The image processing apparatus according to claim 16, wherein the predetermined button is displayed in a home screen for selecting a function to be executed.

18. The image processing apparatus according to claim 16, wherein the predetermined button is a button for starting a print application.

19. A method to be executed by an image processing apparatus, the method comprising:
   accepting a selection of a predetermined button; and
   performing control to display, in a case where the selection of the predetermined button is accepted and a number of jobs of the image processing apparatus is greater than a predetermined number, a screen relating to the job of the number greater than the predetermined number, and to execute, in a case where the selection of the predetermined button is accepted and the number of jobs of the image processing apparatus is equal to the predetermined number, the predetermined number of jobs.

20. A non-transitory computer-readable storage medium storing a program for causing a computer to execute a method, the method comprising:
   accepting a selection of a predetermined button; and
   performing control to display, in a case where the selection of the predetermined button is accepted and a number of jobs of the image processing apparatus is greater than a predetermined number, a screen relating to the job of the number greater than the predetermined number, and to execute, in a case where the selection of the predetermined button is accepted and the number of jobs of the image processing apparatus is equal to the predetermined number, the predetermined number of jobs.

21. An image processing apparatus comprising:
   one or more processors; and
   one or more memories having instructions stored thereon, when executed by the one or more processors, cooperating with the one or more processors cause the image processing apparatus to:
   accept a selection of a predetermined button;
   display, in a case where the selection of the predetermined button is accepted and a predetermined time has elapsed after reception of a job from the image processing apparatus, a screen relating to the job for which the predetermined time has elapsed since reception thereof, and execute, in a case where the selection of the predetermined button is accepted and the predetermined time has not elapsed after reception of a job from the image processing apparatus, the job for which the predetermined time has not elapsed since reception thereof.

22. An image processing apparatus comprising:
   one or more processors; and
   one or more memories having instructions stored thereon, when executed by the one or more processors, cooperating with the one or more processors cause the image processing apparatus to:
   accept a selection of a predetermined button;
   display, in a case where the selection of the predetermined button is accepted and a number of pages of a job of the image processing apparatus is greater than or equal to a predetermined number, a screen relating to the job having pages of the number greater than or equal to the predetermined number, and execute, in a case where the selection of the predetermined button is accepted and the number of pages of a job of the image processing apparatus is less than the predetermined number, the job having pages of the number less than the predetermined number.

* * * * *